United States Patent
Song et al.

(10) Patent No.: US 9,804,433 B2
(45) Date of Patent: Oct. 31, 2017

(54) LIQUID CRYSTAL DISPLAY PANEL OF IMPROVING COLOR WASHOUT

(71) Applicant: Shenzhen China Star Optoelectronics Technology Co., Ltd., Shenzhen (CN)

(72) Inventors: Yanjun Song, Shenzhen (CN); Yongchao Zhao, Shenzhen (CN); Chungching Hsieh, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 212 days.

(21) Appl. No.: 14/888,439

(22) PCT Filed: Oct. 12, 2015

(86) PCT No.: PCT/CN2015/091724
§ 371 (c)(1),
(2) Date: Nov. 1, 2015

(87) PCT Pub. No.: WO2017/041346
PCT Pub. Date: Mar. 16, 2017

(65) Prior Publication Data
US 2017/0160584 A1    Jun. 8, 2017

(30) Foreign Application Priority Data

Sep. 8, 2015 (CN) .......................... 2015 1 0567875

(51) Int. Cl.
*G02F 1/136* (2006.01)
*G02F 1/1335* (2006.01)
(Continued)

(52) U.S. Cl.
CPC ....... *G02F 1/133514* (2013.01); *G02B 5/201* (2013.01); *G02B 5/204* (2013.01);
(Continued)

(58) Field of Classification Search
CPC ......... G02F 1/134363; G02F 1/133514; G02B 5/201; G02B 5/204
See application file for complete search history.

(56) References Cited

U.S. PATENT DOCUMENTS

| 6,525,798 B1 * | 2/2003 | Yamakita .......... G02F 1/134363 349/106 |
| 2016/0011458 A1 * | 1/2016 | Xu ........................ G02F 1/1337 349/96 |

FOREIGN PATENT DOCUMENTS

CN            103645590 A       3/2014

\* cited by examiner

*Primary Examiner* — James Dudek
(74) *Attorney, Agent, or Firm* — Leong C. Lei

(57) ABSTRACT

The present invention provides a liquid crystal display panel of improving color washout, setting different alignment angles in the sub pixel areas of different colors (the included angle between the alignment direction of the liquid crystal molecules and the branch electrode of the pixel electrode). Then, the alignment angle of the red sub pixel area is the largest, and the alignment angle of the green sub pixel area is smaller, and the alignment angle of the blue sub pixel area is smallest. Thus, it is possible to respectively modulate the transmittance-voltage curves and the brightness-voltage curves of the lights of different colors to optimize the white dot chromaticity for satisfying the optical specification and compensate the losing transmittance of the blue light in the panel for improving the color washout problem.

12 Claims, 6 Drawing Sheets

(51) Int. Cl.
 *G02B 5/20* (2006.01)
 *G02F 1/1333* (2006.01)
(52) U.S. Cl.
 CPC .............. *G02F 2001/13356* (2013.01); *G02F 2001/133391* (2013.01)

LIQUID CRYSTAL DISPLAY PANEL OF IMPROVING COLOR WASHOUT

FIELD OF THE INVENTION

The present invention relates to a display technology field, and more particularly to a liquid crystal display panel of improving color washout.

BACKGROUND OF THE INVENTION

The liquid crystal panel mainly comprises a Color Filter (CF), a Thin Film Transistor Array Substrate (TFT Array Substrate) and a Liquid Crystal Layer positioned inbetween. The working principle is that the light of backlight module is reflected to generate images by applying driving voltages to the two glass substrate for controlling the rotations of the liquid crystal molecules. According to the orientation of the liquid crystal, the liquid crystal display panels in the mainstream market can be categorized into several types, which are Vertical Alignment (VA), Twisted Nematic (TN) or Super Twisted Nematic (STN), In-Plane Switching (IPS) and Fringe Field Switching (FFS).

In the IPS mode or the FFS mode, by applying the electric field having the component basically parallel with the substrate, the liquid crystal molecules correspond in the direction parallel with the surface of the substrate and are driven.

Both the IPS liquid crystal display panel and the FFS liquid crystal display panel possess advantage of wide view angle. However, the wavelength of the blue light is shorter. Compared with the red light and the green light, the required retardation for reaching the same transmittance is smaller, and the transmittance-voltage curves of the red light, the green light and the blue light are different; besides, the transmittances of the red light, the green light and the blue light at the film interfaces of the PI film, PFA layer, OC layer and etc. in the panel are different, which also can cause the color washout problem.

For improving the aforesaid color washout problem of the IPS liquid crystal display panel and the FFS liquid crystal display panel, a method of improving the color washout according to prior art is shown in FIG. 1. The thickness of the blue color light resist B in the blue sub pixel area is increased for increasing the thickness of the CF substrate corresponded with the blue sub pixel area. Thus, the cell gap of the blue sub pixel area becomes smaller for achieving the objective that the balance white point generates the color difference; another method of improving the color washout according to prior art is to utilize the post circuit design to respectively adjust the GAMMA curves of the red light, the green light and the blue light to make the white dot chromaticity satisfy the optical specification.

SUMMARY OF THE INVENTION

An objective of the present invention is to provide a liquid crystal display panel of improving color washout, setting different alignment angles in the sub pixel areas of different colors (the included angle between the alignment direction of the liquid crystal molecules and the branch electrode of the pixel electrode) to improve the color washout problem.

For realizing the aforesaid objective, the present invention provides a liquid crystal display panel of improving color washout, comprising an upper substrate, a lower substrate oppositely located to the upper substrate, a liquid crystal layer sandwiched between the upper substrate and the lower substrate, an upper alignment film located at one side of the upper substrate close to the liquid crystal layer, and a lower alignment film located at one side of the lower substrate close to the liquid crystal layer;

liquid crystals in the liquid crystal layer are positive liquid crystals;

the upper alignment film and the lower alignment film are alignment films which can achieve horizontal alignment;

the lower substrate comprises gate lines extending along a horizontal direction, data lines extending along a vertical direction and pixel electrodes; the plurality of gate lines separately arranged along the horizontal direction and the plurality of data lines separately arranged along the vertical direction are mutually insulated and staggered to divide a plurality of red sub pixel areas, a plurality of green sub pixel areas and a plurality of blue sub pixel areas; the red sub pixel areas, the green sub pixel areas and the blue sub pixel areas are provided with the pixel electrodes;

the pixel electrode comprises two strip horizontal electrodes which are mutually parallel and spaced, and a plurality of strip branch electrodes connected between the two strip horizontal electrodes which are mutually parallel, and certain included angles A appear between the strip branch electrodes and the data lines;

an alignment direction of the liquid crystal molecules in the liquid crystal layer is parallel with the data line;

a relation among included angles $A_R$ between the strip branch electrodes and the data lines in the red sub pixel area, included angles $A_G$ between the strip branch electrodes and the data lines in the green sub pixel area and included angles $A_B$ between the strip branch electrodes and the data lines in the blue sub pixel area is: $A_R > A_G > A_B$.

The included angles A between the strip branch electrodes and the data lines are smaller than 30°.

The included angles $A_R$ between the strip branch electrodes and the data lines in the red sub pixel area are 15°; the included angles $A_G$ between the strip branch electrodes and the data lines in the green sub pixel area are 10°; the included angles $A_B$ between the strip branch electrodes and the data lines in the blue sub pixel area are 5°.

The present invention further provides a liquid crystal display panel of improving color washout, comprising an upper substrate, a lower substrate oppositely located to the upper substrate, a liquid crystal layer sandwiched between the upper substrate and the lower substrate, an upper alignment film located at one side of the upper substrate close to the liquid crystal layer, and a lower alignment film located at one side of the lower substrate close to the liquid crystal layer;

liquid crystals in the liquid crystal layer are positive liquid crystals;

the upper alignment film and the lower alignment film are alignment films which can achieve horizontal alignment;

the lower substrate comprises gate lines extending along a horizontal direction, data lines extending along a vertical direction and pixel electrodes; the plurality of gate lines separately arranged along the horizontal direction and the plurality of data lines separately arranged along the vertical direction are mutually insulated and staggered to divide a plurality of red sub pixel areas, a plurality of green sub pixel areas and a plurality of blue sub pixel areas; the red sub pixel areas, the green sub pixel areas and the blue sub pixel areas are provided with the pixel electrodes;

the pixel electrode comprises two strip horizontal electrodes which are mutually parallel and spaced, and a plurality of branch electrodes connected to the two strip horizontal electrodes which are mutually parallel and spaced, and the branch electrodes comprises first strip branch electrodes having included angles A with the data lines, and second strip branch electrodes having included angles -A with the data lines;

an alignment direction of the liquid crystal molecules in the liquid crystal layer is parallel with the data line;

a relation among included angles $A_R$ between the first strip branch electrodes and the data lines in the red sub pixel area, included angles $A_G$ between the first strip branch electrodes and the data lines in the green sub pixel area and included angles $A_B$ between the first strip branch electrodes and the data lines in the blue sub pixel area is: $A_R>A_G>A_B$.

The included angles A between the first strip branch electrodes and the data lines are smaller than 30°.

The included angles $A_R$ between the first strip branch electrodes and the data lines in the red sub pixel area are 15°; the included angles $A_G$ between the first strip branch electrodes and the data lines in the green sub pixel area are 10°; the included angles $A_B$ between the first strip branch electrodes and the data lines in the blue sub pixel area are 5°.

The present invention further provides another liquid crystal display panel of improving color washout, comprising an upper substrate, a lower substrate oppositely located to the upper substrate, a liquid crystal layer sandwiched between the upper substrate and the lower substrate, an upper alignment film located at one side of the upper substrate close to the liquid crystal layer, and a lower alignment film located at one side of the lower substrate close to the liquid crystal layer;

liquid crystals in the liquid crystal layer are positive liquid crystals;

the upper alignment film and the lower alignment film are alignment films which can achieve horizontal alignment;

the lower substrate comprises gate lines extending along a horizontal direction, data lines extending along a vertical direction and pixel electrodes; the plurality of gate lines separately arranged along the horizontal direction and the plurality of data lines separately arranged along the vertical direction are mutually insulated and staggered to divide a plurality of red sub pixel areas, a plurality of green sub pixel areas and a plurality of blue sub pixel areas; the red sub pixel areas, the green sub pixel areas and the blue sub pixel areas are provided with the pixel electrodes;

the pixel electrode comprises two strip horizontal electrodes which are mutually parallel and spaced, and a plurality of strip branch electrodes connected between the two strip horizontal electrodes which are mutually parallel, and the strip branch electrodes and the data lines are parallel;

certain included angles A appear between an alignment direction of liquid crystal molecules in the liquid crystal layer and the data lines, and a relation among included angles $A_R$ between alignment direction of liquid crystal molecules and the data lines in the red sub pixel area, included angles $A_G$ between alignment direction of liquid crystal molecules and the data lines in the green sub pixel area and included angles $A_B$ between alignment direction of liquid crystal molecules and the data lines in the blue sub pixel area is: $A_R>A_G>A_B$.

The included angles A between the alignment direction of liquid crystal molecules in the liquid crystal layer and the data lines are smaller than 30°.

The included angles $A_R$ between the alignment direction of liquid crystal molecules and the data lines in the red sub pixel area are 15°; the included angles $A_G$ between the alignment direction of liquid crystal molecules and the data lines in the green sub pixel area are 10°; the included angles $A_B$ between the alignment direction of liquid crystal molecules and the data lines in the blue sub pixel area are 5°.

The alignment of the upper alignment film and the lower alignment film is rubbing alignment or light alignment.

The benefits of the present invention are: the present invention provides a liquid crystal display panel of improving color washout. By setting different alignment angles (the included angle between the alignment direction of the liquid crystal molecules and the branch electrode of the pixel electrode) in the sub pixel areas of different colors, the alignment angle of the blue sub pixel area is the smallest, and the brightness of the blue sub pixel at 255 gray scale is the largest, which can compensate the losing transmittance at the film interfaces of the PI film, PFA layer, OC layer and etc. in the panel. The liquid crystal display panel of the present invention sets different alignment angles in the sub pixel areas of different colors to modulate the transmittance-voltage curves of different colors to ultimately make the white dot chromaticity satisfy the optical specification for improving the color washout problem.

In order to better understand the characteristics and technical aspect of the invention, please refer to the following detailed description of the present invention is concerned with the diagrams, however, provide reference to the accompanying drawings and description only and is not intended to be limiting of the invention.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
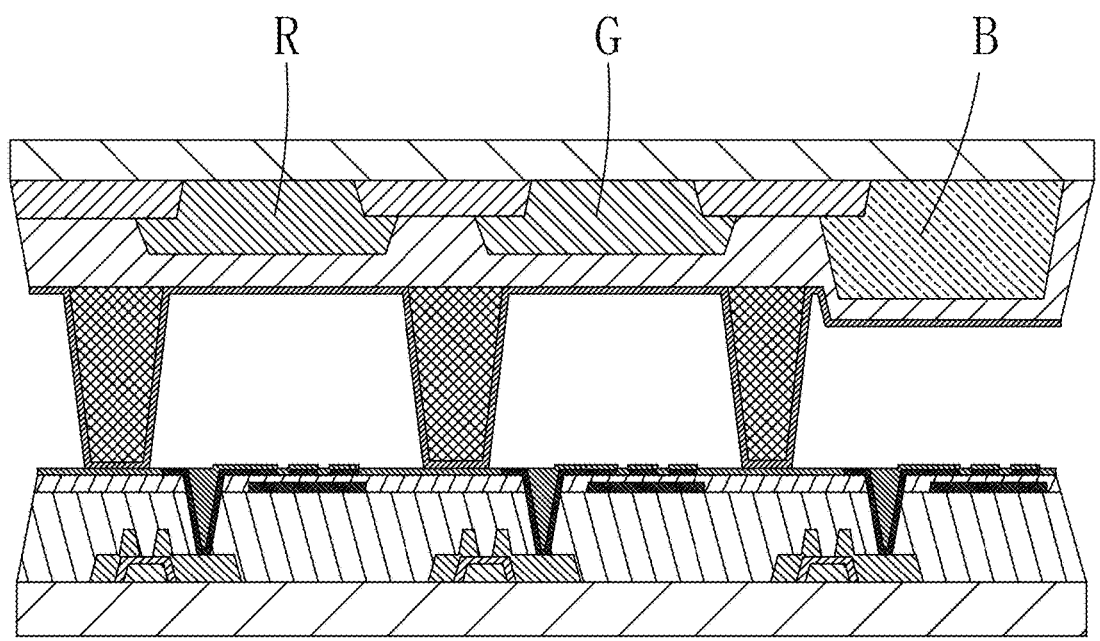
FIG. 1 is a structure diagram of a liquid crystal display panel of improving color washout according to prior art.
Figure 2:
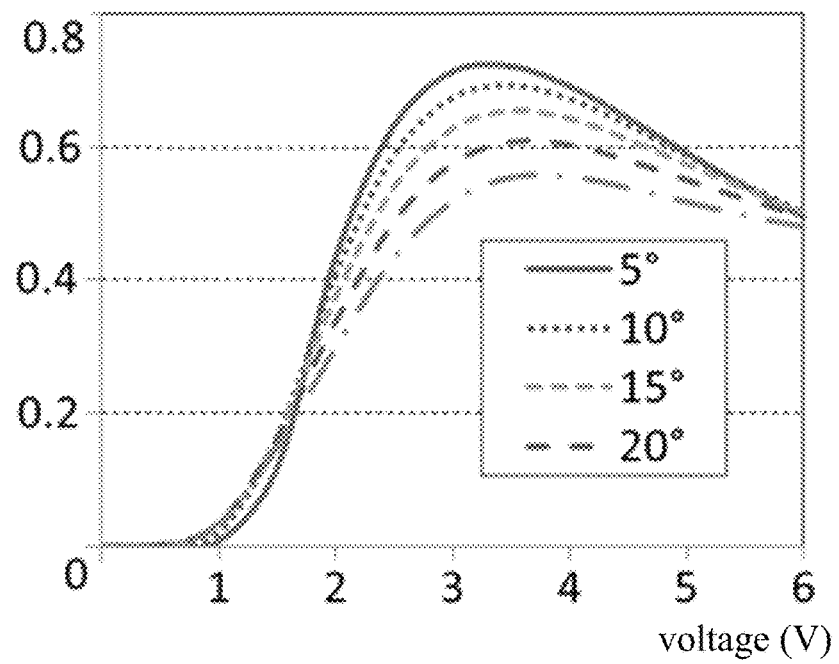
FIG. 2 is a simulation result diagram of a curve that the transmittance of the light corresponding to various alignment angles changes along with the voltage variation.
Figure 3:
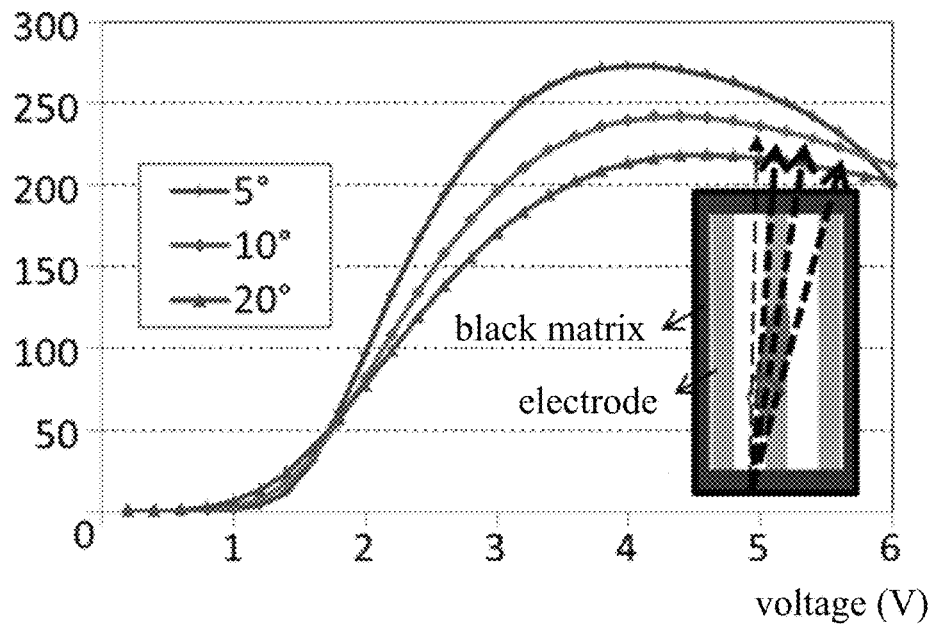
FIG. 3 is an experiment result diagram of a curve that the brightness of the liquid crystal display panel corresponding to various alignment angles changes along with the voltage variation.

The inventive idea of the present invention is based on the following principles:

As shown in FIG. 2 and FIG. 3, the included angle between the alignment direction of the liquid crystal molecules and the branch electrode of the pixel electrode is defined to be an alignment angle. FIG. 2 shows a simulation result of the transmittance-voltage curve of the light corresponding to various alignment angles. FIG. 3 shows an experiment result of the brightness-voltage curve of the liquid crystal display panel corresponding to various alignment angles. As shown in FIG. 2 and FIG. 3, along with the increase of the alignment angle, the transmittance of the light decreases, and then, the brightness of the liquid crystal display panel is reduced, and the threshold voltage drops, too. The curves of experiment result and the simulation result have the same change trend. Therefore, the design of the present invention sets different alignment angles in the sub pixel areas of different colors to adjust the brightness distribution of the various sub pixel areas to ultimately optimize the white dot chromaticity for improving the color washout problem.

Based on the aforesaid principles, the present invention first provides a liquid crystal display panel of improving color washout, comprising an upper substrate, a lower substrate oppositely located to the upper substrate, a liquid crystal layer sandwiched between the upper substrate and the lower substrate, an upper alignment film located at one side of the upper substrate close to the liquid crystal layer, and a lower alignment film located at one side of the lower substrate close to the liquid crystal layer;

liquid crystals in the liquid crystal layer are positive liquid crystals.

The upper alignment film and the lower alignment film are alignment films which can achieve horizontal alignment, and the specific alignment can be rubbing alignment or light alignment.

Figure 4:
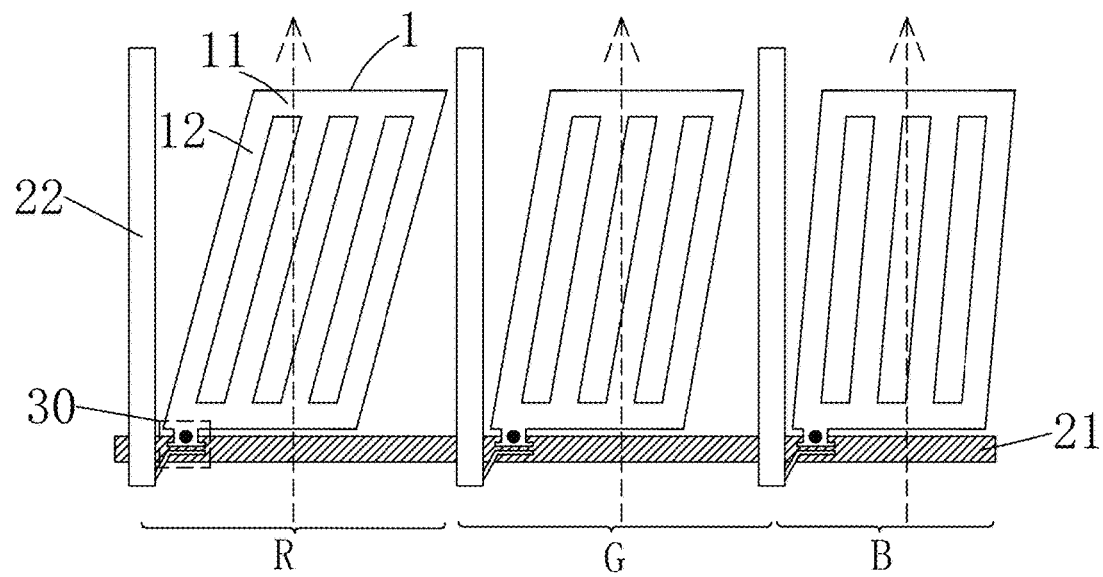
FIG. 4 is a structure diagram showing a lower substrate of the first embodiment of the liquid crystal display panel of improving color washout according to the present invention.

Please refer to FIG. 4, which is a structure diagram showing a lower substrate of the first embodiment of the liquid crystal display panel of improving color washout according to the present invention. The lower substrate comprises gate lines 21 extending along a horizontal direction, data lines 22 extending along a vertical direction and pixel electrodes 1; the plurality of gate lines 21 separately arranged along the horizontal direction and the plurality of data lines 22 separately arranged along the vertical direction are mutually insulated and staggered to divide a plurality of red sub pixel areas R, a plurality of green sub pixel areas G and a plurality of blue sub pixel areas B; the red sub pixel areas R, the green sub pixel areas G and the blue sub pixel areas B are provided with the pixel electrodes 1;

the pixel electrode 1 comprises two strip horizontal electrodes 11 which are mutually parallel and spaced, and a plurality of strip branch electrodes 12 connected between the two strip horizontal electrodes 11 which are mutually parallel, and certain included angles A appear between the strip branch electrodes 12 and the data lines 22;

an alignment direction of the liquid crystal molecules in the liquid crystal layer is parallel with the data line 22;

a relation among included angles $A_R$ between the strip branch electrodes 12 and the data lines 22 in the red sub pixel area R, included angles $A_G$ between the strip branch electrodes 12 and the data lines 22 in the green sub pixel area G and included angles $A_B$ between the strip branch electrodes 12 and the data lines 22 in the blue sub pixel area B is: $A_R>A_G>A_B$.

Specifically, the included angles A between the strip branch electrodes 12 and the data lines 22 are smaller than 30°.

Preferably, the included angles $A_R$ between the strip branch electrodes 12 and the data lines 22 in the red sub pixel area R are 15°; the included angles $A_G$ between the strip branch electrodes 12 and the data lines 22 in the green sub pixel area G are 10°; the included angles $A_B$ between the strip branch electrodes 12 and the data lines 22 in the blue sub pixel area B are 5°.

Figure 5:
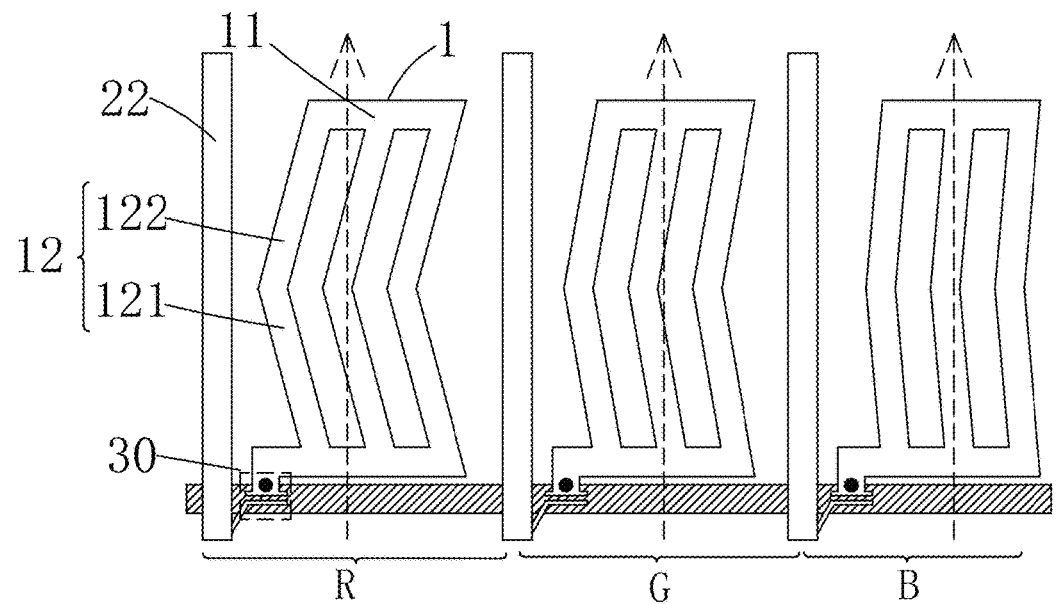
FIG. 5 is a structure diagram showing a lower substrate of the second embodiment of the liquid crystal display panel of improving color washout according to the present invention.

Please refer to FIG. 5, which is a structure diagram showing a lower substrate of the second embodiment of the liquid crystal display panel of improving color washout according to the present invention. The lower substrate comprises gate lines 21 extending along a horizontal direction, data lines 22 extending along a vertical direction and pixel electrodes 1; the plurality of gate lines 21 separately arranged along the horizontal direction and the plurality of data lines 22 separately arranged along the vertical direction are mutually insulated and staggered to divide a plurality of red sub pixel areas R, a plurality of green sub pixel areas G and a plurality of blue sub pixel areas B; the red sub pixel areas R, the green sub pixel areas G and the blue sub pixel areas B are provided with the pixel electrodes 1;

the pixel electrode 1 comprises two strip horizontal electrodes 11 which are mutually parallel and spaced, and a plurality of strip branch electrodes 12 connected between the two strip horizontal electrodes 11 which are mutually parallel, and the branch electrodes 12 comprises first strip branch electrodes 121 having included angles A with the data lines 22, and second strip branch electrodes 122 having included angles −A with the data lines 22;

an alignment direction of the liquid crystal molecules in the liquid crystal layer is parallel with the data line 22;

a relation among included angles $A_R$ between the first strip branch electrodes 121 and the data lines 22 in the red sub pixel area R, included angles $A_G$ between the first strip branch electrodes 121 and the data lines 22 in the green sub pixel area G and included angles $A_B$ between the first strip branch electrodes 121 and the data lines 22 in the blue sub pixel area B is: $A_R>A_G>A_B$.

Specifically, the included angles A between the first strip branch electrodes 121 and the data lines 22 are smaller than 30°.

Preferably, the included angles $A_R$ between the first strip branch electrodes 121 and the data lines 22 in the red sub pixel area R are 15°; the included angles $A_G$ between the first strip branch electrodes 121 and the data lines 22 in the green sub pixel area G are 10°; the included angles $A_B$ between the first strip branch electrodes 121 and the data lines 22 in the blue sub pixel area B are 5°.

Specifically, in the aforesaid first and second embodiments, the lower substrate further comprises TFTs 30 distributed in the red, green and blue sub pixel areas R, G, B. The TFT 30 comprises a gate, a source and a drain. The gate of the TFT 30 is coupled to the gate line 21, and the source is coupled to the data line 22 and the drain is coupled to the pixel electrode 1.

In the aforesaid liquid crystal display panel of improving color washout, the alignment directions of the liquid crystal molecules in respective sub pixel areas are the same. By setting the branch electrodes of the pixel electrodes in the sub pixel areas of different colors to have different tilt angles, the alignment angle (the included angle between the alignment direction of the liquid crystal molecules and the branch electrode of the pixel electrode) of the blue sub pixel area is the smallest, and the brightness of the blue sub pixel at 255 gray scale is the largest, which can compensate the losing transmittance at the film interfaces of the PI film, PFA film, OC layer and etc. in the panel. The liquid crystal display panel of the present invention sets different included angles (alignment angles) between the alignment direction of the liquid crystal molecules and the branch electrode of the pixel electrode in the sub pixel areas of different colors to modulate the transmittance-voltage curves of the sub pixel areas of different colors to ultimately make the white dot chromaticity satisfy the optical specification for improving the color washout problem.

The present invention further provides a liquid crystal display panel of improving color washout, comprising an upper substrate, a lower substrate oppositely located to the upper substrate, a liquid crystal layer sandwiched between the upper substrate and the lower substrate, an upper alignment film located at one side of the upper substrate close to the liquid crystal layer, and a lower alignment film located at one side of the lower substrate close to the liquid crystal layer;

liquid crystals in the liquid crystal layer are positive liquid crystals.

The upper alignment film and the lower alignment film are alignment films which can achieve horizontal alignment, and the specific alignment can be rubbing alignment or light alignment.

Figure 6:
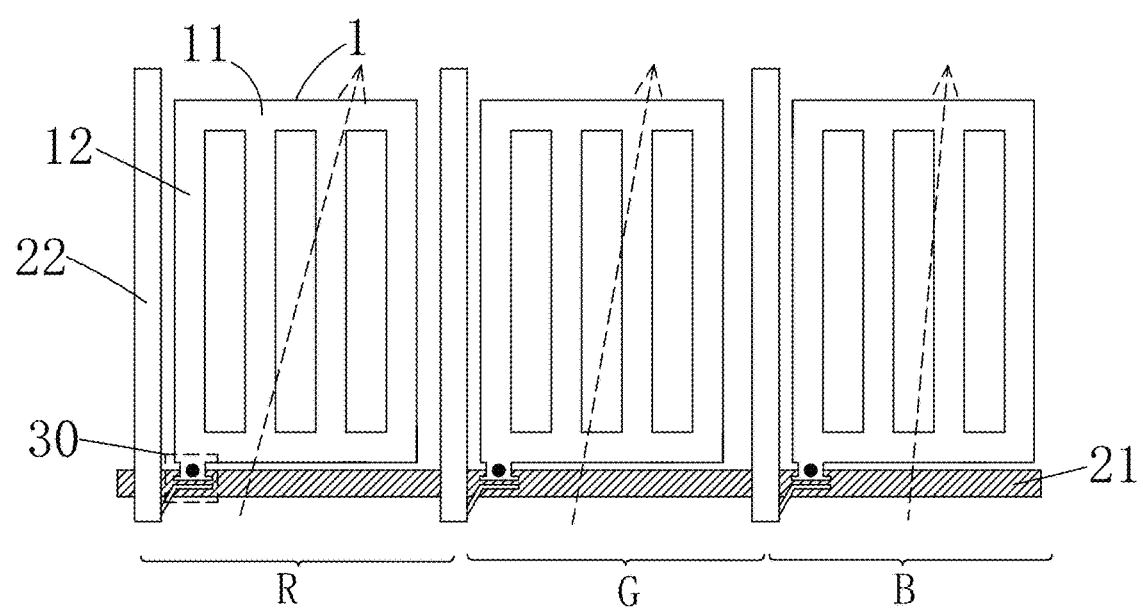
FIG. 6 is a structure diagram showing a lower substrate of the third embodiment of the liquid crystal display panel of improving color washout according to the present invention.

Please refer to FIG. 6, which is a structure diagram showing a lower substrate of the third embodiment of the liquid crystal display panel of improving color washout according to the present invention. The lower substrate comprises gate lines 21 extending along a horizontal direction, data lines 22 extending along a vertical direction and pixel electrodes 1; the plurality of gate lines 21 separately arranged along the horizontal direction and the plurality of data lines 22 separately arranged along the vertical direction are mutually insulated and staggered to divide a plurality of red sub pixel areas R, a plurality of green sub pixel areas G and a plurality of blue sub pixel areas B; the red sub pixel areas R, the green sub pixel areas G and the blue sub pixel areas B are provided with the pixel electrodes 1;

the pixel electrode 1 comprises two strip horizontal electrodes 11 which are mutually parallel and spaced, and a plurality of strip branch electrodes 12 connected between the two strip horizontal electrodes 11 which are mutually parallel, and the strip branch electrodes 12 and the data lines 22 are parallel;

certain included angles A appear between an alignment direction of liquid crystal molecules in the liquid crystal layer and the data lines 22, and a relation among included angles $A_R$ between alignment direction of liquid crystal molecules and the data lines 22 in the red sub pixel area R, included angles $A_G$ between alignment direction of liquid crystal molecules and the data lines 22 in the green sub pixel area G and included angles $A_B$ between alignment direction of liquid crystal molecules and the data lines 22 in the blue sub pixel area B is: $A_R > A_G > A_B$.

Specifically, the included angles A between the alignment direction of liquid crystal molecules in the liquid crystal layer and the data lines 22 are smaller than 30°.

Preferably, the included angles $A_R$ between the alignment direction of liquid crystal molecules and the data lines 22 in the red sub pixel area R are 15°; the included angles $A_G$ between the alignment direction of liquid crystal molecules and the data lines 22 in the green sub pixel area G are 10°; the included angles $A_B$ between the alignment direction of liquid crystal molecules and the data lines 22 in the blue sub pixel area B are 5°.

Specifically, in the aforesaid third embodiment, the lower substrate further comprises TFTs 30 distributed in the red, green and blue sub pixel areas R, G, B. The TFT 30 comprises a gate, a source and a drain. The gate of the TFT 30 is coupled to the gate line 21, and the source is coupled to the data line 22 and the drain is coupled to the pixel electrode 1.

Figure 7:
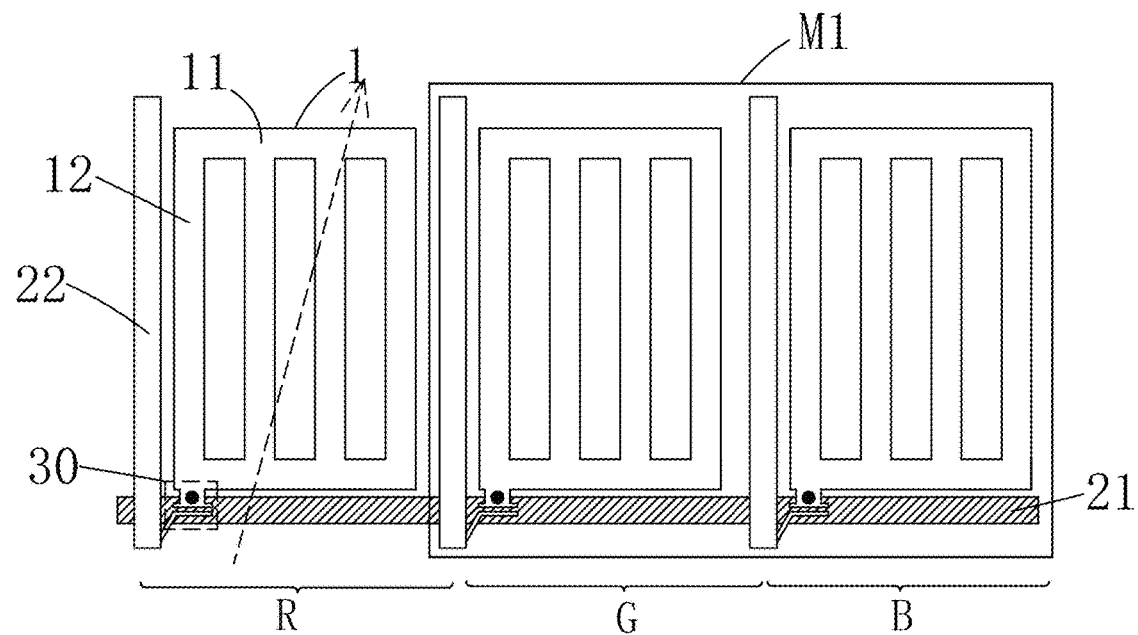
FIG. 7 to FIG. 9 are process diagrams showing the alignment procedure of the lower alignment film of the third embodiment of the liquid crystal display panel of improving color washout according to the present invention.
Figure 8:
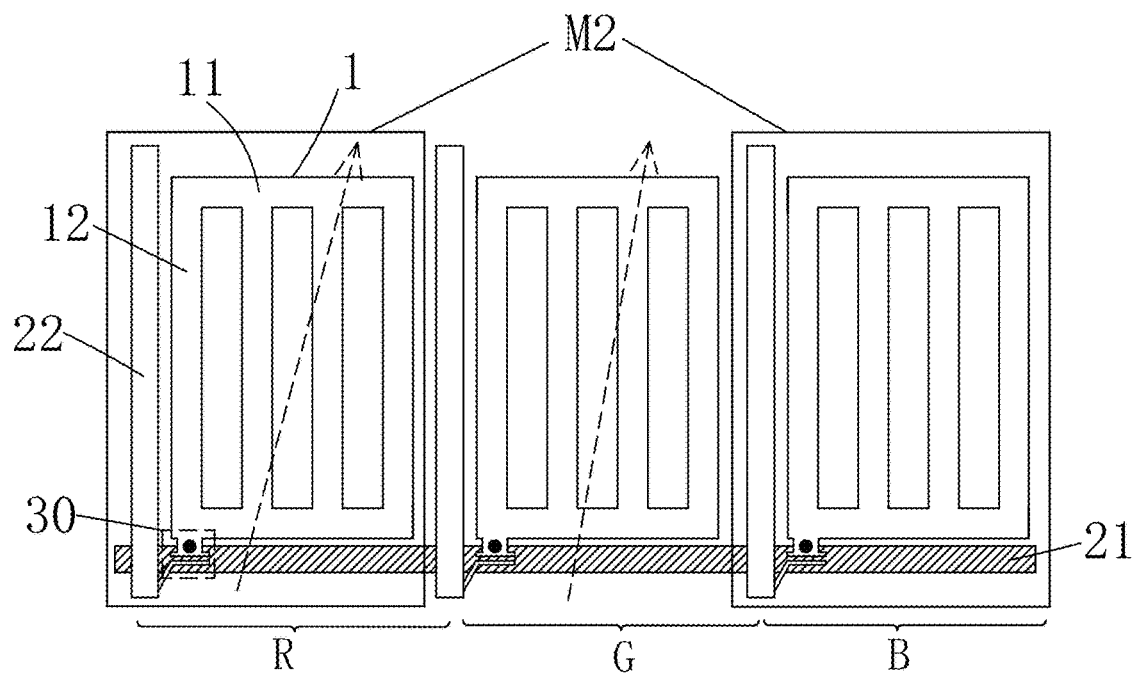
Figure 9:
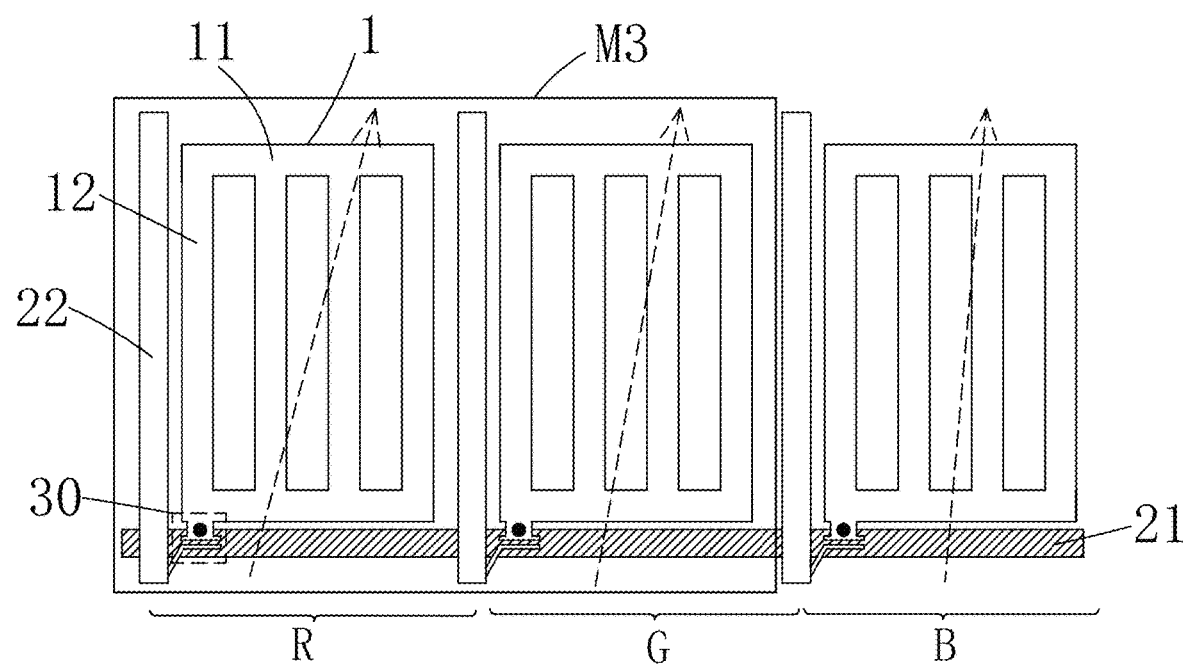

Specifically, in the aforesaid third embodiment, the alignment procedure of the upper alignment film and the lower alignment film is: referring to FIGS. 7-9, after coating an alignment film on the lower substrate, a mask M1 is employed to first shield the green sub pixel area G and the blue sub pixel area B of the lower substrate, and the alignment is implemented to the lower alignment film in the red sub pixel area R; then, a mask M2 is employed to shield the red sub pixel area R and the blue sub pixel area B, and the alignment is implemented to the lower alignment film in the green sub pixel area G; finally, a mask M3 is employed to shield the red sub pixel area R and the green sub pixel area G, and the alignment is implemented to the lower alignment film in the blue sub pixel area B; the alignment order of the upper alignment films in the upper substrate is the same as the alignment order of the lower alignment films; after the alignments to the upper, lower alignment films have respectively accomplished, the upper, lower substrates are assembled and the liquid crystal layer is injected into the assembled liquid crystal display panel. The liquid crystal molecules in the red sub pixel area R have the largest alignment angle (the included angle between the alignment direction of the liquid crystal molecules and the branch electrode of the pixel electrode), such as 15°; the liquid crystal molecules in the green sub pixel area G have the smaller alignment angle, such as 10°; the liquid crystal molecules in the blue sub pixel area B have the smallest alignment angle, such as 5°.

In the aforesaid liquid crystal display panel of improving color washout, the structures of the pixel electrodes in respective sub pixel areas are the same. The mask is employed to implement alignment of various angles to the liquid crystal molecules in the sub pixel areas of various colors, and then, the alignment angle of the blue sub pixel area is the smallest, and the brightness of the blue sub pixel at 255 gray scale is the largest, which can compensate the losing transmittance at the film interfaces of the PI film, PFA film, OC layer and etc. in the panel. The liquid crystal display panel of the present invention sets different included angles (alignment angles) between the alignment direction of the liquid crystal molecules and the branch electrode of the pixel electrode in the sub pixel areas of different colors to modulate the transmittance-voltage curves of the lights of different colors to ultimately make the white dot chromaticity satisfy the optical specification for improving the color washout problem.

In conclusion, in the liquid crystal display panel of improving color washout according to the present invention, by setting different alignment angles (the included angle between the alignment direction of the liquid crystal molecules and the branch electrode of the pixel electrode) in the sub pixel areas of different colors, the alignment angle of the blue sub pixel area is the smallest, and the brightness of the blue sub pixel at 255 gray scale is the largest, which can compensate the losing transmittance at the film interfaces of the PI film, PFA layer, OC layer and etc. in the panel. The liquid crystal display panel of the present invention sets different alignment angles in the sub pixel areas of different colors to modulate the transmittance-voltage curves of different colors to ultimately make the white dot chromaticity satisfy the optical specification for improving the color washout problem.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A liquid crystal display panel of improving color washout, comprising an upper substrate, a lower substrate oppositely located to the upper substrate, a liquid crystal layer sandwiched between the upper substrate and the lower substrate, an upper alignment film located at one side of the upper substrate close to the liquid crystal layer, and a lower alignment film located at one side of the lower substrate close to the liquid crystal layer;

liquid crystals in the liquid crystal layer are positive liquid crystals;

the upper alignment film and the lower alignment film are alignment films which can achieve horizontal alignment;

the lower substrate comprises gate lines extending along a horizontal direction, data lines extending along a vertical direction and pixel electrodes; the plurality of gate lines separately arranged along the horizontal direction and the plurality of data lines separately arranged along the vertical direction are mutually insulated and staggered to divide a plurality of red sub pixel areas, a plurality of green sub pixel areas and a plurality of blue sub pixel areas; the red sub pixel areas, the green sub pixel areas and the blue sub pixel areas are provided with the pixel electrodes;

the pixel electrode comprises two strip horizontal electrodes which are mutually parallel and spaced, and a plurality of strip branch electrodes connected between the two strip horizontal electrodes which are mutually parallel, and certain included angles A appear between the strip branch electrodes and the data lines;

an alignment direction of the liquid crystal molecules in the liquid crystal layer is parallel with the data line;

a relation among included angles $A_R$ between the strip branch electrodes and the data lines in the red sub pixel area, included angles $A_G$ between the strip branch electrodes and the data lines in the green sub pixel area and included angles $A_B$ between the strip branch electrodes and the data lines in the blue sub pixel area is: $A_R>A_G>A_B$.

2. The liquid crystal display panel of improving color washout according to claim 1, wherein the included angles A between the strip branch electrodes and the data lines are smaller than 30°.

3. The liquid crystal display panel of improving color washout according to claim 1, wherein the included angles $A_R$ between the strip branch electrodes and the data lines in the red sub pixel area are 15°; the included angles $A_G$ between the strip branch electrodes and the data lines in the green sub pixel area are 10°; the included angles $A_B$ between the strip branch electrodes and the data lines in the blue sub pixel area are 5°.

4. The liquid crystal display panel of improving color washout according to claim 1, wherein the alignment of the upper alignment film and the lower alignment film is rubbing alignment or light alignment.

5. A liquid crystal display panel of improving color washout, comprising an upper substrate, a lower substrate oppositely located to the upper substrate, a liquid crystal layer sandwiched between the upper substrate and the lower substrate, an upper alignment film located at one side of the upper substrate close to the liquid crystal layer, and a lower alignment film located at one side of the lower substrate close to the liquid crystal layer;

liquid crystals in the liquid crystal layer are positive liquid crystals;

the upper alignment film and the lower alignment film are alignment films which can achieve horizontal alignment;

the lower substrate comprises gate lines extending along a horizontal direction, data lines extending along a vertical direction and pixel electrodes; the plurality of gate lines separately arranged along the horizontal direction and the plurality of data lines separately arranged along the vertical direction are mutually insulated and staggered to divide a plurality of red sub pixel areas, a plurality of green sub pixel areas and a plurality of blue sub pixel areas; the red sub pixel areas, the green sub pixel areas and the blue sub pixel areas are provided with the pixel electrodes;

the pixel electrode comprises two strip horizontal electrodes which are mutually parallel and spaced, and a plurality of branch electrodes connected to the two strip horizontal electrodes which are mutually parallel and spaced, and the branch electrodes comprises first strip branch electrodes having included angles A with the data lines, and second strip branch electrodes having included angles −A with the data lines;

an alignment direction of the liquid crystal molecules in the liquid crystal layer is parallel with the data line;

a relation among included angles $A_R$ between the first strip branch electrodes and the data lines in the red sub pixel area, included angles $A_G$ between the first strip branch electrodes and the data lines in the green sub pixel area and included angles $A_B$ between the first strip branch electrodes and the data lines in the blue sub pixel area is: $A_R>A_G>A_B$.

6. The liquid crystal display panel of improving color washout according to claim 5, wherein the included angles A between the first strip branch electrodes and the data lines are smaller than 30°.

7. The liquid crystal display panel of improving color washout according to claim 5, wherein the included angles $A_R$ between the first strip branch electrodes and the data lines in the red sub pixel area are 15°; the included angles $A_G$ between the first strip branch electrodes and the data lines in the green sub pixel area are 10°; the included angles $A_B$ between the first strip branch electrodes and the data lines in the blue sub pixel area are 5°.

8. The liquid crystal display panel of improving color washout according to claim 5, wherein the alignment of the upper alignment film and the lower alignment film is rubbing alignment or light alignment.

9. A liquid crystal display panel of improving color washout, comprising an upper substrate, a lower substrate oppositely located to the upper substrate, a liquid crystal layer sandwiched between the upper substrate and the lower substrate, an upper alignment film located at one side of the upper substrate close to the liquid crystal layer, and a lower alignment film located at one side of the lower substrate close to the liquid crystal layer;

liquid crystals in the liquid crystal layer are positive liquid crystals;

the upper alignment film and the lower alignment film are alignment films which can achieve horizontal alignment;

the lower substrate comprises gate lines extending along a horizontal direction, data lines extending along a vertical direction and pixel electrodes; the plurality of gate lines separately arranged along the horizontal direction and the plurality of data lines separately arranged along the vertical direction are mutually insulated and staggered to divide a plurality of red sub pixel areas, a plurality of green sub pixel areas and a plurality of blue sub pixel areas; the red sub pixel areas, the green sub pixel areas and the blue sub pixel areas are provided with the pixel electrodes;

the pixel electrode comprises two strip horizontal electrodes which are mutually parallel and spaced, and a plurality of strip branch electrodes connected between the two strip horizontal electrodes which are mutually parallel, and the strip branch electrodes and the data lines are parallel;

certain included angles A appear between an alignment direction of liquid crystal molecules in the liquid crystal layer and the data lines, and a relation among included angles $A_R$ between alignment direction of liquid crystal molecules and the data lines in the red sub pixel area, included angles $A_G$ between alignment direction of liquid crystal molecules and the data lines in the green sub pixel area and included angles $A_B$ between alignment direction of liquid crystal molecules and the data lines in the blue sub pixel area is:
$A_R > A_G > A_B$.

10. The liquid crystal display panel of improving color washout according to claim 9, wherein the included angles A between the alignment direction of liquid crystal molecules in the liquid crystal layer and the data lines are smaller than 30°.

11. The liquid crystal display panel of improving color washout according to claim 9, wherein the included angles $A_R$ between the alignment direction of liquid crystal molecules and the data lines in the red sub pixel area are 15°; the included angles $A_G$ between the alignment direction of liquid crystal molecules and the data lines in the green sub pixel area are 10°; the included angles $A_B$ between the alignment direction of liquid crystal molecules and the data lines in the blue sub pixel area are 5°.

12. The liquid crystal display panel of improving color washout according to claim 9, wherein the alignment of the upper alignment film and the lower alignment film is rubbing alignment or light alignment.

* * * * *